United States Patent [19]
Tanaka

[11] Patent Number: 5,002,363
[45] Date of Patent: Mar. 26, 1991

[54] STEREOSCOPIC SHEET WITH TWO MARKS FOR ACCOMMODATION OF FOCUS AND ANGLE OF CONVERGENCE

[76] Inventor: Hirozi Tanaka, Room 301, Nissho-Hakata Bldg., 3-28, Nakagofuku-machi, Hakata-ku Fukuoka-shi, Fukuoka-ken, Japan

[21] Appl. No.: 456,483

[22] Filed: Dec. 26, 1989

[30] Foreign Application Priority Data

Jan. 5, 1989 [JP] Japan .................................. 64-226[U]

[51] Int. Cl.⁵ ...................... G02B 27/04; G02B 27/22; G02B 27/32
[52] U.S. Cl. ...................................... 350/140; 350/133
[58] Field of Search ........................ 350/140, 133, 250

[56] References Cited

U.S. PATENT DOCUMENTS

| | | | |
|---|---|---|---|
| 174,893 | 3/1876 | Bierstadt | 350/140 |
| 2,283,777 | 5/1942 | Wendling | 350/140 |
| 2,724,991 | 11/1955 | Levine | 350/140 |
| 2,868,071 | 1/1959 | Kiehl | 350/140 |

FOREIGN PATENT DOCUMENTS 1026988 3/1958 France .................................. 350/140
26689 of 1905 United Kingdom ................ 350/140

*Primary Examiner*—Jon W. Henry
*Attorney, Agent, or Firm*—Fleit, Jacobson, Cohn, Price, Holman & Stern

[57] ABSTRACT

Disclosed herein is a steroscopic sheet which comprises one sheet, a lens portion provided at one end portion of the sheet, the lens portion comprising a pair of lenses spaced from each other by the interval of a person's eyes in parallel to the end edge of the one end portion of the sheet, and an image portion provided at the other end portion of the sheet, the image portion comprising a pair of stereoscopic images arranged side by side in parallel to the end edge of the other end portion of the sheet, the lens portion and the image portion being so arranged that the lens and image portions are capable of being erected, with the focal distance of the lenses. Each of the lenses may be adhered to a stepped portion formed by a first through-hole provided in the one end portion and a second through-hole provided in a backing sheet attached to the back side of the one end portion of the sheet. A mark for accommodation of focus and angle of convergence may be provided on the lower side of each of the images of the image portion.

2 Claims, 2 Drawing Sheets

STEREOSCOPIC SHEET WITH TWO MARKS FOR ACCOMMODATION OF FOCUS AND ANGLE OF CONVERGENCE

BACKGROUND OF THE INVENTION

1. Field of the Invention

This invention relates to a stereoscopic sheet which is able to be used directly as a piece of ordinary mass media and be easily assembled to be a stereoscope.

2. Description of the Prior Art

Stereoscopic devices for viewing stills as a three-dimensional image, designed for easy assembly, have hitherto been disclosed in, for instance, Japanese Utility Model Application Laid-Open (KOKAI) Nos. 49-44259 (1974) and 49-17676 (1974), Japanese Utility Model Publication (KOKOKU) No. 52-22276 (1977), and Japanese Utility Model Application Laid-Open (KOKAI) Nos. 53-140455 (1978), 55-52119 (1980), 56-161613 (1981), 57-136920 (1982), 57-142715 (1982), 57-136919 (1982), 61-116320 (1986), 61-128619 (1986) and 62-109135 (1987).

However, the conventional stereoscopic devices disclosed in the above publications, formed mainly of a sheet material such as cardboard, are designed primarily for only easy assembly of a stereoscope and, therefore, are inconvenient for the use of the sheet material itself as a piece of advertising or other mass media.

SUMMARY OF THE INVENTION

It is an object of this invention to provide a stereoscopic sheet which enables stills or printed matter to be utilized directly as a piece of mass media and which is capable of being easily assembled to be a stereoscope for viewing a three-dimensional image therein.

According to this invention, there is provided a stereoscopic sheet comprising one sheet, a lens portion provided at one end portion of the sheet, the lens portion comprising a pair of lenses spaced from each other by the interval of a person's eyes in parallel to the end edge of the one end portion of the sheet, and an image portion provided at the other end portion of the sheet, the image portion comprising a pair of stereoscopic images arranged side by side in parallel to the end edge of the other end portion of the sheet, the lens portion and the image portion being so arranged that the lens and image portions are capable of being erected, with the focal distance of the lenses.

The lens portion may have a construction in which first through-holes having a diameter slightly greater than the diameter of the lenses are provided in the one end portion, a backing sheet provided with second through-holes having a diameter slightly smaller than the diameter of the lenses is attached to the back side of the one end portion, and a peripheral portion of each of the lenses is adhered to a stepped portion formed by the first through-hole and the second through-hole.

It is preferable to provide a mark for accommodation of focus and angle of convergence on the lower side of each of the images of the image portion, in order to easily obtain a stereoscopic impression.

The above and other objects, features and advantage of this invention will become apparent from the following description and appended claims, taken in conjunction with the accompanying drawings which show by way of example some preferred embodiments of this invention.

DESCRIPTION OF PREFERRED EMBODIMENTS

This invention will be described in more detail below, based on some preferred embodiments of the invention.

Figure 1:
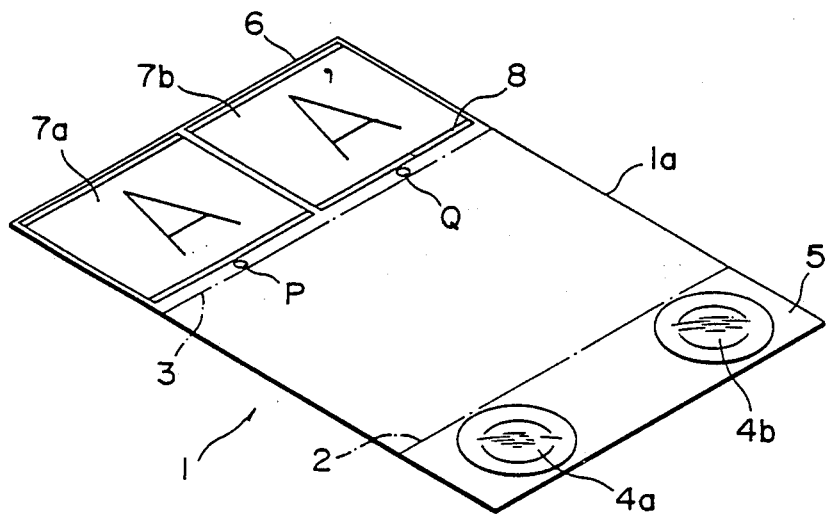
FIG. 1 is a perspective view of a stereoscopic sheet according to one embodiment of this invention, in a developed state.

FIG. 1 illustrates a stereoscopic sheet according to one embodiment of this invention.

Referring to the figure the stereoscopic sheet 1 according to one embodiment of this invention comprises two lenses 4a and 4b provided at one end portion 5 of the sheet 1 to constitute a lens portion, and two photographs 7a and 7b arranged side by side at the other end portion 6 of the sheet 1 to constitute an image portion, with an intermediate portion 1a provided between the lens portion and the image portion. The intermediate portion 1a is so sized that the spacing between the lens portion and the image portion is equal to the focal distance of the lenses 4a, 4b in the lens portion. Folding lines 2, 3 are provided on the inner side of the end portions 5, 6 of the sheet 1.

The sheet 1 may be formed of a paper, a plastic or the like with an area and a thickness in the order of the area and thickness of a post card.

Figure 3:
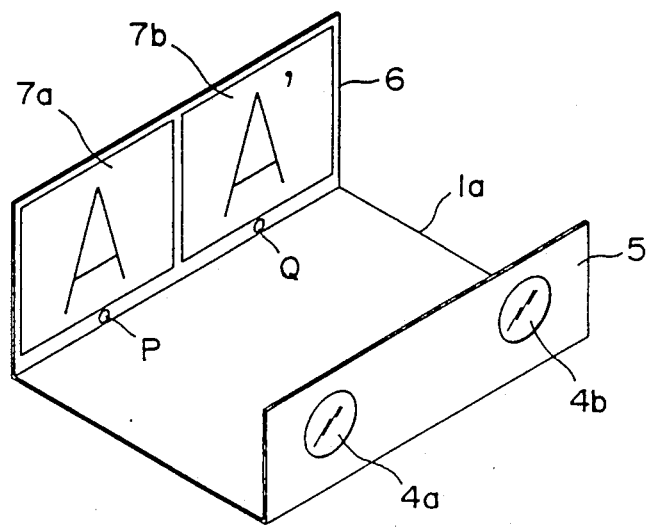
FIG. 3 is a perspective view of the stereoscopic sheet in the condition of being used.

The two lenses 4a and 4b provided at the one end portion of the sheet 1, for viewing photographs therethrough in a use condition as shown in FIG. 3, are disposed at an interval therebetween of about 50 to 60 mm. The interval between the lenses 4a and 4b may be roughly equal to the standard interval of a person's eyes according to the ages of the expected users, and it is not necessary to strictly set the interval. The thickness of the lenses 4a, 4b should not be extremely large as compared with the thickness of the sheet 1, because such an extremely large lens thickness makes the sheet 1 inconvenient to use. It is recommendable to use single-sheet lenses about 0.5 to 2 mm in thickness. The focal distance of the lenses may be about 80 mm where the size of the sheet 1 used is roughly equal to that of a post card. The lenses 4a, 4b may be formed of a glass, but plastic lenses are preferred because of their lightness in weight, anti-breaking properties and inexpensiveness.

Figure 2:
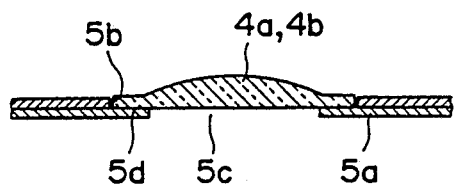
FIG. 2 is a sectional view showing the mounting construction of lens in the stereoscopic sheet.

FIG. 2 shows a mounting construction of the lenses.

A backing sheet 5a is attached to the back side of the one end portion 5 of the sheet 1. The end portion 5 of the sheet 1 is provided with through-holes 5b slightly greater than the lenses 4a, 4b in diameter, and the backing sheet 5a being provided with through-holes 5c slightly smaller than the lenses 4a, 4b in diameter. The through-hole 5b and the through-hole 5c form a stepped portion 5d, to which the peripheral portion of each of the lenses 4a, 4b is adhered by an adhesive, a pressure sensitive adhesive sheet or the like. With the lenses 4a and 4b thus mounted on the stepped portions 5d, the lenses 4a and 4b do not protrude from the sheet 1 and, therefore, will not hinder mailing, transportation or the like of the sheet 1.

The two photographs 7a, 7b (in the figure, the images are represented by A and A', by way of convenience arranged side by side at the other end portion 6 of the sheet 1 are two photographs taken by a so-called stereo camera or taken of an object by an ordinary camera with a horizontal change in camera position of about 50 to 60 mm. Each of the photographs is suitably about 40 to 50 mm by about 40 to 60 mm when used. The photographs 7a and 7b may be pasted directly to the sheet 1, or may be detachably mounted on the sheet 1 by providing a mount frame 8. Furthermore, the photographs 7a, 7b may be printed on the sheet 1 itself.

On the other end portion 6 of the sheet 1, marks P and Q for accommodation of focus and angle of convergence are printed on the lower side of the photographs 7a and 7b, respectively. The marks P and Q are red circles about 2 mm in diameter, with a cross pattern printed in black in each of the red circles.

The sheet 1 constructed as above is capable of being utilized as a piece of various advertising media, with talent's photographs or photographs of a landscape or the like thereon. For instance, the photographs are disposed at the other end portion 6 of the sheet 1 whereas a talent's profile or an explanation of an article of commerce is printed on the intermediate portion 1a. Alternatively, directions for use of the stereoscopic sheet may be printed on the one end portion 5 of the sheet. Furthermore, borders for a postage stamp, a postal code number, etc. for use of the sheet 1 as a post card may be printed on the back side of the sheet 1.

The sheet 1 is used as a stereoscope in the condition where the end portions are erected by bending the sheet 1 at the folding lines 2 and 3 thereof, as shown in FIG. 3. As shown in the figure, the sheet 1 with the photographs 7a, 7b thereon is bent at the folding lines 2, 3 to erect both the end portions 5, 6 so as to oppose the lenses 4a, 4b to the photographs 7a, 7b, and the photographs 7a, 7b are viewed through the lenses 4a, 4b, whereby the photographs 7a, 7b are seen as a single three-dimensional image.

In order to obtain the desired stereoscopic impression, in this case, such an accommodation should be made that the foci of the eyes are adjusted to the plane of the photographs 7a and 7b and, in addition, the left eye looks at only the photograph 7a while the right eye looks at only the photograph 7b. Namely, the foci of the eyes are adjusted to near points while the optic axes of the eyes are set substantially parallel. Accordingly, the angle of convergence between the optic axes of the eyes is substantially zero. In everyday life, however, we are accustomed to accommodate our eyes to a long focal distance and a small angle of convergence when looking at a remote object and to accommodate our eyes to a short focal distance and a large angle of convergence when looking at a near object. Therefore, it is not easy for us to make the angle of convergence substantially zero while maintaining a short focal distance. In consideration of the above, the user first accommodates the foci and angle of convergence of his eyes by paying attention to the easily discernible marks P and Q for accommodation of focus and angle of convergence, and then turns his eyes upon the photographs 7a and 7b. In this procedure, it is easy for the user to make the angle of convergence substantially zero while maintaining the short focal distance, and, to obtain a stereoscopic impression.

Figure 4:
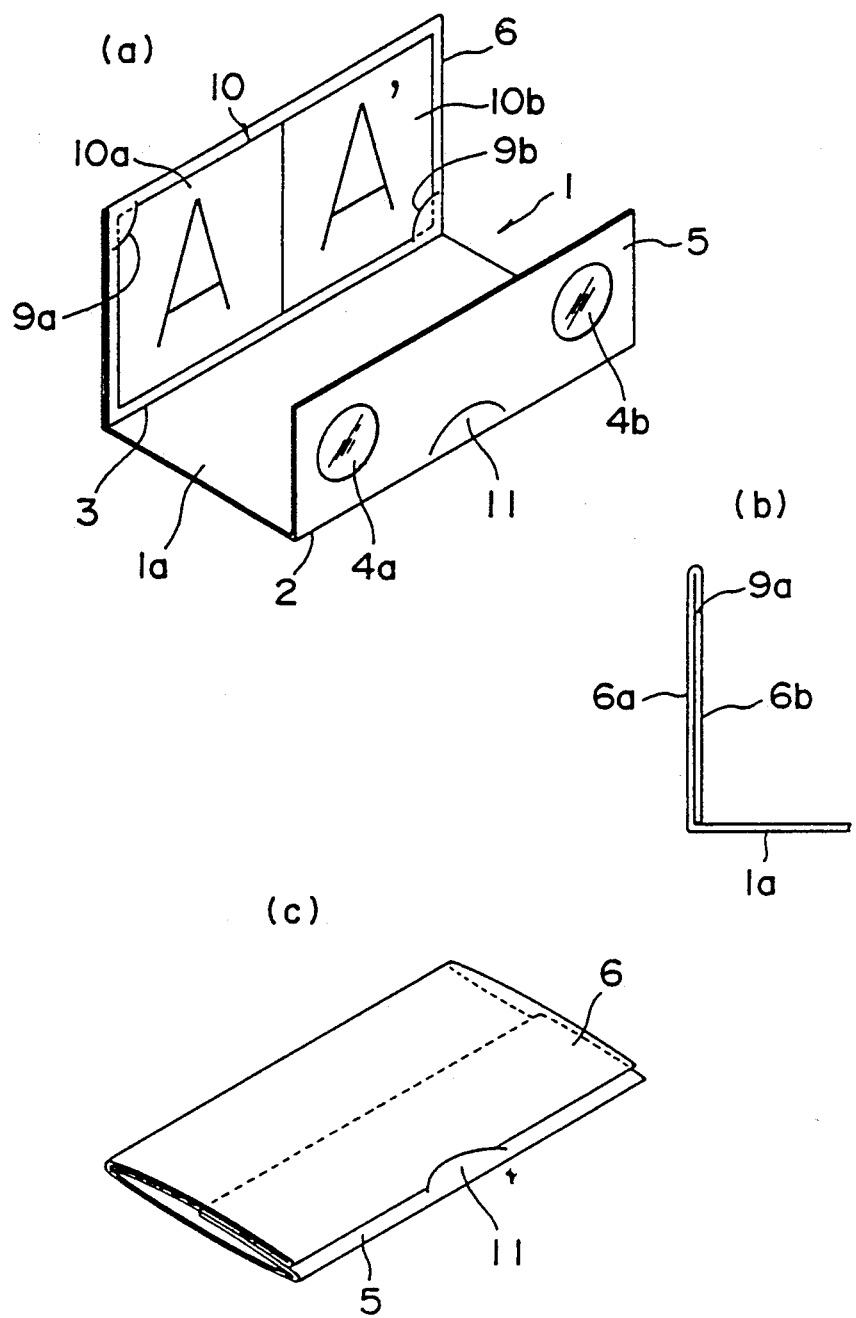
FIGS. 4(a), 4(b) and 4(c) are views showing another embodiment of this invention.

FIGS. 4 illustrate a stereoscopic sheet according to another embodiment of this invention, in which FIG. 4(a) shows the stereoscopic sheet in the use condition thereof, FIG. 4(b) shows a sectional view of an important part of the stereoscopic sheet, and FIG. 4(c) shows the stereoscopic sheet in the folded condition thereof. In the figures, the component members equivalent to those shown in FIG. 1 are assigned the same reference numerals as used in FIG. 1, and a detailed description of such component members will be omitted.

In this embodiment, the sheet 1 is so sized that it is substantially as large as a calling card when folded at folding lines 2 and 3. With such a size, the sheet 1 is portable and easy to send by mail or the like. In addition, the other end portion 6 of the sheet 1 may be folded to the inside to obtain a double-sheet structure of an outer sheet 6a and an inner sheet 6b, with a pair of slant cuts 9a, 9b provided in diagonally opposed corner portions of the inner sheet 6b. Then, a photograph 10 is mounted by inserting corner portions of the photograph 10 into the cuts 9a, 9b. In this case, the photograph 10 may be a single photograph having stereoscopic images 10a and 10b at the left and the right, respectively. Also, a single photograph holder with two photographs pasted thereon may be used. When an end portion 5 is provided with a cut 11 as shown in FIG. 4(a), it is possible to insert the leading edge of the end portion 6 into the cut 11 upon folding the sheet 1 as shown in FIG. 4(c), resulting in that the end portion 6 serves as a protective sheet for lenses 4a, 4b and the photographs 7a, 7b.

The stereoscopic sheet according to this invention, as described above, has the following advantages.

(1) The sheet enables the user to amuse himself, in an inexpensive and handy manner, with a three-dimensional image of photographs or the like without any restrictions on time and place.

(2) The main body of the stereoscope is of an assemblable type and assumes a plate-like form when folded or developed, which ensures eminent handiness in storing and carrying the stereoscope.

(3) When sized to be substantially as large as a post card, the sheet is capable of being utilized as a post card such as a New Year's card, various kinds of greeting cards such as the ones of wedding, a picture card, etc., direct mail, or a Christmas, birthday or other gift card.

(4) With required information recorded on a marginal portions of the main body of the stereoscope, the sheet is capable of being utilized as a pamphlet, catalog or the like, or as an appendix to a book, package or the like.

(5) When folded, the sheet is capable of being utilized as a casing for cards (e.g., telephone cards), calling cards, photographs, bromides, picture cards, etc.

I claim:

1. A stereoscopic sheet comprising one sheet, a lens portion provided at one end portion of the sheet, the lens portion comprising a pair of lenses spaced from each other by the interval of a person's eyes in parallel to the end edge of the one end portion of the sheet, and
   an image portion provided at the other end portion of the sheet, the image portion comprising a pair of stereoscopic images arranged side by side in parallel to the end edge of the other end portion of the sheet,
   a mark for accommodation of focus and angle of convergence being provided on a lower side of each of the images of the image portion, and
   an intermediate portion extending between the lens portion and the image portion a distance equal to the focal distance of the lenses and connected to the lens portion and the image portion, whereby the lens portion and the image portion are capable of being erected separated by the focal distance of the lenses.

2. The stereoscopic sheet claimed in claim 1, wherein first through-holes having a diameter slightly greater than the diameter of the lenses are provided in the one end portion of the sheet, a backing sheet provided with second through-holes having a diameter slightly smaller than the diameter of the lenses is attached to the back side of the one end portion of the sheet, and a peripheral portion of each of the lenses is adhered to a stepped portion formed by the first through-hole and the second through-hole.

* * * * *